3,290,285
METHOD OF PRODUCTION OF 5'-GUANYLIC ACID

Saburo Senoo and Nobumitsu Yano, Tokyo, and Toshio Kato, Omiya-shi, and Hiroshi Hayashi, Tokyo, Japan, assignors to Asahi Kasei Kogyo Kabushiki Kaisha, Kitaku, Osaka, Japan, a corporation of Japan
No Drawing. Filed Feb. 19, 1964, Ser. No. 345,839
Claims priority, application Japan, Feb. 21, 1963, 38/7,579
2 Claims. (Cl. 260—211.5)

The present invention relates to the method of isolating and collecting 5'-guanylic acid (guanosine-5'-monophosphate) in the form of free acid or alkali salt from the chemical reaction mixture or biological material containing 5'-guanylic acid at a pH value within a range from 1 to 5.0.

At present, there are known methods for the production of 5'-guanylic acid by chemical synthesis, fermentation and enzymatic degradation. In those methods 5'-guanylic acid is usually isolated in the form of less soluble barium salt of 5'-guanylic acid by adding barium acetate or barium hydroxide to an aqueous solution containing the product. In the reports on phosphorylation of 2'-3'-O-isopropylidene-guanosine with phosphorylating agents, for example, (1) tetra-p-nitrophenyl pyrophosphate (R. W. Chamber et al., J. Am. Chem. Soc., 79, 3747 (1957)), (2) 2-cyanoethylphosphate (C. M. Tener, J. Am. Chem. Soc., 83, 159 (1961), (3) tetrachloropyrophosphate (E. Thilo et al., Ger. Pat. 1,119,278) and the like, the 5'-guanylic acid formed is isolated as a barium salt. However, it is necessary to convert 5'-guanylic acid to a water soluble derivative, for example, to disodium salt as commercially available when it will be employed as seasonings. Recently, the disodium salt of 5'-guanylic acid has been produced by isolating 5'-guanylic acid from the almost neutralized reaction mixture as barium salt, converting the salt to the free acid and neutralizing the acid with sodium hydroxide. The method has suffered from some drawbacks, such as difficulty of purification of the product owing to the byformation of inorganic barium phosphate in the production step, poor yields, etc., which have limited its industrial utility.

In order to overcome the above-mentioned drawbacks, the inventors of the present invention have attempted to develop improved simple methods of isolation of the phosphate which are practical on an industrial scale. In the course of a study, we have discovered that in acidic range 5'-guanylic acid is present in the form of free acid or mono alkali salt, which is less soluble in water and in which the inorganic phosphates do not precipitate from the solution. Based on this discovery, we have established a method of isolation of pure guanylic acid in good yields in the form of free acid or mono alkali salt from the reaction mixture without conversion of the product to the barium salt.

After shielding the 2', 3'-positions of guanosine with a protective group generally used in the protection of hydroxyl group of sugar, such as isopropylidene group (I), acyl group (II), benzylidene group (III) and the like, the compound is phosphorylated with organo-phosphorylating agents, such as tetra-p-nitrophenyl pyro-phosphate (IV), bis-p-nitrophenyl phosphochloridate (V), diphenyl phosphochloridate (VI), dibenzylphosphochloridate (VII), 2-cyanoethyl phosphate (VIII) and the like or inorgano phosphorylating agents, such as tetrachloropyrophosphate (IX), phosphorous oxychloride (X) and the like. Then, the protective group present in the phosphorylating agent employed, such as p-nitrophenyl group, 2-cyanoethyl group, phenyl group, benzyl group is removed by a well known method, for example, by treating the resultant product with an alkali solution if the product is produced with (IV), (V) or (VIII), or by catalytically reducing the product if the product is produced with (VI) or (VII). Subsequently the protective group at 2', 3'-positions of guanosine is removed by a well known method per se, for example, by treating the product in acidic solution if the protective group is (I) or (III), or in alkaline solution if the protective group is (II). Then, from the resultant reaction solution the 5'-guanylic acid is precipitated in the form of free acid or mono alkali salt by standing the solution adjusted to pH 1-5.0 at a cool place after removal, if necessary, of any remaining phosphorylating agent and compounds derived from the protective group of the agent, such as bis-p-nitrophenylphosphate, p-nitrophenol and the like, or in the presence of the phosphorylation agent and compounds derived therefrom if the agent is (VI), (VII), (VIII) or the like. The precipitate thus formed is collected, washed with an organic solvent if necessary, dissolved in hot water, neutralized with an alkali hydroxide and cooled to yield a dialkalimetal salt of 5'-guanylic acid.

A pH value from 1.0 and 5.0 may be preferably employed, since the solubility of 5'-guanylic acid is relatively increased in the lower pH range, and near neutral, 5'-guanylic acid is markedly decomposed under strongly acidic conditions this being the case because the yield of 5'-guanylic acid decreases with increased solubility of 5'-guanylic acid when the pH exceeds 5.0.

From the description above mentioned it will be clearly understood that, compared with previous methods of isolation in the form of barium salts, the industrial advantages of the method of the present invention are apparent in its simpler operation and better yields, and especially in easier separation of inorganic phosphate and other phosphates from 5'-guanylic acid, which has been regarded as being very difficult, and in the more effective recovery of 5'-guanylic acid from a highly concentrated phosphate co-existing solution.

5'-guanylic acid obtained by the method of the present invention is a compound of the general formula:

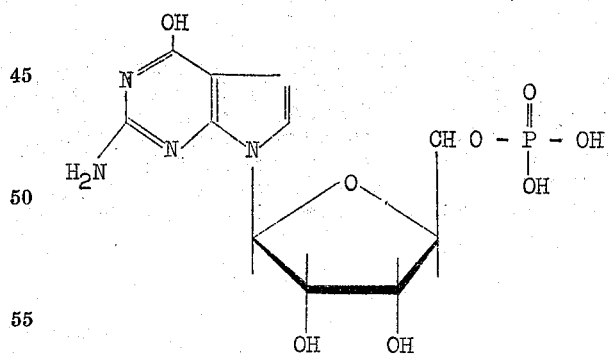

which is an important substance in the chemical food industry, as seasonings, as is, or with L-glutamic acid mono-sodium salt, and is also an important compound in the biochemical field, since it is known as a constituent of nucleic acids.

The processes shown in following examples were conducted to illustrate the present invention more fully.

Example 1

Phosphorylation of 10.0 g. of 2',3'-O-isopropylidene-guanosine is carried out with bis-p-nitrophenylphosphate and di-p-tolylcarbodiimide in dioxane in the manner shown by R. W. Chamber et al. (J. Am. Chem. Soc. 79 3747 (1957)) and dioxane is removed from the reaction mixture and the resultant residue is treated with potassium hydroxide and potassium bis-p-nitrophosphate is precipitated and is filtered. Then, the filtrate is heated on a steam bath, adjusted to pH 2.5 with concentrated hydrochloric acid and heated again to remove the p-nitrophenyl group and the isopropylidene group. After concentration of the resultant solution containing mono potassium salt of 5'-guanylic acid to 80 ml., the concentrated solution (pH 2.5) is allowed to stand in a cool place to precipitate 5'-guanylic acid in an almost theoretical amount in the form of crystals of mono potassium salt. The crystal is collected, washed with ether and dissolved in 50 ml. of water, the aqueous solution being adjusted to pH 7.5 with 1 N-potassium hydroxide and to the solution the same amount of acetone is added to give 8.1 g. of dipotassium salt of 5'-guanylic acid. Simplicity of the salt is ascertained by paper chromatography with several solvents in which the salt always shows only one spot of 5'-guanylic acid.

*Example 2*

Acetonation of 10.0 g. of guanosine is carried out in the manner as shown by A. Hampton (J. Am. Chem. Soc. 83 3645 (1961)). From the reaction mixture acetone is removed by distillation and the obtained viscid residue containing 2',3'-O-isopropylidene-guanosine is phosphorylated as described in Example 1. After removal of dioxane under reduced pressure the residue is treated with 1 N-sodium hydroxide and the sodium bis-p-nitrophenylphosphate precipitated is filtered off. The filtrate obtained is heated on a steam bath, adjusted to pH 2.5 and heated to remove the p-nitrophenyl group and the isopropylidene group. After removal of p-nitrophenol by extraction with ether under cooled conditions, the resultant reaction mixture (pH 2.5) is concentrated to about 1/3 its volume and to the solution the same amount of acetone is added and the mixture is allowed to stand in a cool place. The precipitation of mono sodium salt of 5'-guanylic acid is filtered, dissolved in 50 ml. of water and neutralized with 1 N-sodium hydroxide, then to the solution the same amount of acetone is added and the mixture is allowed to stand to yield 6.6 g. of disodium salt of 5'-guanylic acid. Simplicity of the salt is ascertained by paper chromatography with several solvents in which the salt always shows only one spot of 5'-guanylic acid. According to a common method with ion-exchange resin, the purity of the compound is also ascertained.

*Example 3*

Phosphorylation of 6.5 g. of 2',3'-O-isopropylidene-guanosine is carried out with 2-cyanoethylphosphate in pyridine in the manner shown by G. M. Tener (J. Am. Chem. Soc. 83 159 (1961)). The resultant reaction mixture is treated with 0.4 N-sodium hydroxide for 1 hour on a steam bath to remove cyanoethyl group and the mixture is cooled, and dicyclohexylurea and polymer of acetonitrile are filtered as precipitates. The filtrate is adjusted to pH 2.5 and heated on a steam bath to remove isopropylidene group. The reaction mixture is concentrated to 50 ml., and cooled to precipitate mono sodium salt of 5'-guanylic acid. The precipitate is dissolved in 50 ml. of water and adjusted to pH 7.5 with 1 N-sodium hydroxide, and to the solution the same amount of acetone is added and the mixture is allowed to stand to yield 6.9 g. of disodium salt of 5'-guanylic acid.

*Example 4*

10.0 g. of 2',3'-di-O-acetyl guanosine is phosphorylated as described in Example 1 and treated in sodium hydroxide solution to hydrolyze bis-p-nitrophenyl group and acetyl group. After cooling the hydrolyzed solution, precipitated sodium p-nitrophenolate is removed and the filtrate is adjusted to pH 4.0 with concentrated hydrochloric acid and allowed to stand over night in a cool place to precipitate mono sodium salt of 5'-guanylic acid. The salt is dissolved in 50 ml. of water, adjusted to pH 7.5 and to the solution the same amount of acetone is added and the whole is cooled to give 4.5 g. of disodium salt of 5'-guanylic acid.

*Example 5*

The experiment was conducted as in Example 4 above with the exception that the pH of the filtrate is adjusted to 1.0 with concentrated hydrochloric acid, and that finally 6.0 grams of disodium salt of 5'-guanylic acid is obtained.

What we claim is:

1. A process for producing 5'-guanylic acid comprising adding to a solution containing 5'-guanylic acid and at least one impurity substance, and alkali hydroxide, adjusting the pH of said solution to a value between 1.0 and 5.0, cooling the said solution, and filtering guanylic acid and its alkali metal salt which crystallizes.

2. In a method for producing 5'-guanylic acid in which a solution containing inorganic phosphate and 5'-guanylic acid is synthesized by phosphorylating a guanosine substituent, an improvement comprising adding to said solution alkali hydroxide, adjusting the pH of said solution to a value between 1 and 5, cooling the solution and filtering guanylic acid and its alkali metal salt which crystallizes.

References Cited by the Examiner

UNITED STATES PATENTS

| | | | |
|---|---|---|---|
| 2,891,945 | 6/1959 | Stark | 260—211.5 |
| 3,079,379 | 2/1963 | Tanaka et al. | 260—211.5 |
| 3,157,635 | 11/1964 | Tanaka et al. | 260—211.5 |
| 3,157,636 | 11/1964 | Sanno et al. | 260—211.5 |
| 3,157,637 | 11/1964 | Khym | 260—211.5 |

LEWIS GOTTS, *Primary Examiner.*

J. R. BROWN, P. A. STITH, *Assistant Examiners.*